(12) United States Patent
Akash et al.

(10) Patent No.: US 7,628,951 B1
(45) Date of Patent: Dec. 8, 2009

(54) PROCESS FOR MAKING CERAMIC INSULATION

(75) Inventors: Akash Akash, Salt Lake City, UT (US); Nair Balakrishnan G., Sandy, UT (US)

(73) Assignee: Ceramatec, Inc., Salt Lake City ( * ) Notice: Subject to any disclaimer, the term of this patent is extended or adjusted under 35 U.S.C. 154(b) by 0 days.

(21) Appl. No.: 11/464,476

(22) Filed: Aug. 14, 2006

Related U.S. Application Data

(60) Provisional application No. 60/729,128, filed on Oct. 21, 2005.

(51) Int. Cl.
B28B 1/00 (2006.01)
C04B 33/00 (2006.01)

(52) U.S. Cl. ........................ 264/603; 501/142

(58) Field of Classification Search ................ 264/603; 501/142
See application file for complete search history.

(56) References Cited

U.S. PATENT DOCUMENTS

| | | | |
|---|---|---|---|
| 3,945,839 A | 3/1976 | Manigault | |
| 4,056,398 A | 11/1977 | Rechter et al. | |
| 4,069,057 A | 1/1978 | Kamei et al. | |
| 4,174,226 A | 11/1979 | Fitzpatrick et al. | |
| 4,233,184 A | 11/1980 | Cull | |
| 4,294,618 A | 10/1981 | Anthonis | |
| 4,440,865 A | 4/1984 | Salazar | |
| 4,751,204 A | 6/1988 | Kyoden et al. | |
| 4,833,576 A | 5/1989 | Mers et al. | |
| 4,898,701 A | 2/1990 | Atkinson et al. | |
| 4,992,396 A | 2/1991 | McGarry et al. | |
| 5,035,919 A | 7/1991 | Sugino et al. | |
| 5,190,899 A | 3/1993 | Sutor | |
| 5,284,808 A | 2/1994 | Damiano et al. | |
| 5,338,711 A | 8/1994 | Fitch et al. | |
| 5,371,050 A | 12/1994 | Belitskus et al. | |
| 5,641,584 A | 6/1997 | Andersen et al. | |
| 5,858,900 A | 1/1999 | Azizian et al. | |
| 5,962,076 A * | 10/1999 | Mason et al. | ............ 427/376.2 |
| 6,013,592 A | 1/2000 | Merrill et al. | |
| 6,309,994 B1 | 10/2001 | Marra et al. | |
| 6,458,732 B1 | 10/2002 | Doza et al. | |
| 6,676,783 B1 | 1/2004 | Merrill et al. | |
| 6,699,342 B2 | 3/2004 | DiChiara | |

(Continued)

OTHER PUBLICATIONS

Rahaman, M. N.; Ceramic Processing and Sintering (New York: Marcel Dekker, 1995), 38-40.*

(Continued)

*Primary Examiner*—Carlos Lopez
*Assistant Examiner*—Russell J Kemmerle, III
(74) *Attorney, Agent, or Firm*—David Fonda

(57) ABSTRACT

A method is provided for producing insulation materials and insulation for high temperature applications using novel castable and powder-based ceramics. The ceramic components produced using the proposed process offers (i) a fine porosity (from nano-to micro scale); (ii) a superior strength-to-weight ratio; and (iii) flexibility in designing multilayered features offering multifunctionality which will increase the service lifetime of insulation and refractory components used in the solid oxide fuel cell, direct carbon fuel cell, furnace, metal melting, glass, chemical, paper/pulp, automobile, industrial heating, coal, and power generation industries. Further, the ceramic components made using this method may have net-shape and/or net-size advantages with minimum post machining requirements.

44 Claims, 7 Drawing Sheets

U.S. PATENT DOCUMENTS

| | | |
|---|---|---|
| 6,716,782 B2 | 4/2004 | Heng et al. |
| 6,740,299 B2 | 5/2004 | Carini et al. |
| 6,858,174 B2 | 2/2005 | Nair et al. |
| 6,864,199 B2 | 3/2005 | Doza et al. |

OTHER PUBLICATIONS

Griffin, Steven "Written Opinion of the International Searching Authority", *Griffin, Steven, Written Opinion of the International Searching Authority*, (Nov. 14, 2007), 1-5.

\* cited by examiner

PROCESS FOR MAKING CERAMIC INSULATION

CROSS-REFERENCE TO RELATED APPLICATION

This application claims the benefit of U.S. Provisional Application No. 60/729,128 filed Oct. 21, 2005 and incorporated herein by reference.

STATEMENT REGARDING FEDERALLY SPONSORED RESEARCH

This invention was made in part with government support under Contract No.: DE-FG02-03ER83619 awarded by the Department of Energy and Contract/Award No.: DMI-0321692, awarded by the National Science Foundation. The Government has certain rights in the inventions.

BACKGROUND OF THE INVENTION

The present invention relates in general to methods for producing ceramic insulation by introducing very small-sized porosity in the fired ceramic in a controlled fashion, and production of multilayered, multifunctional ceramic components. Further, the present invention includes methods to produce net-shape and/or net-size ceramic insulation components. The present invention would be applicable for high temperature applications as insulation or refractory components. The insulation can be designed for both load-bearing (structural) and non-load bearing applications.

The availability of a high alumina, silica-free, fiber-free insulation with fine porosity will fulfill unmet needs for various industries.

In the solid oxide fuel cell industry, silica in the insulation surrounding the fuel cell is detrimental for the long-term performance of the solid oxide fuel cells (SOFC). Silica, in the presence of humidity and high temperatures converts into a gaseous form SiO, which may then react and adversely affect the fuel cell performance. Therefore, a silica-free, oxide-based insulation is desired for SOFC. Currently, there are only two alternative commercially-available products that meet the need for high alumina, silica-free insulation for solid oxide fuel cells. Both have significantly high cost. Thus, it would be an advancement in the art to provide a lower cost high alumina insulation to fuel cell manufacturers.

In the furnace industry, fiber-based (non-load bearing) insulation is the most commonly used high temperature insulation. Alumina-fiber insulation is used in reducing environments or where there is high humidity and/or high temperature requirements. However, manufacture and use of high alumina fiber-based insulation is often associated with health concerns and high product cost. Thus, it would be an improvement in the art if an alumina-based fiber-free insulation is available with the additional benefit of lower cost.

Most of the oxide based, silica-free, structural (load-bearing) insulation have a density of 2.5-3.0 g/cc and a flexural strength of less than <10 MPa (1450 psi). Further, the flexural strength of the insulation quickly degrades (sometimes by as much as 50%) when exposed to temperatures above 600° C. i.e. they have poor hot strength. It would be an improvement in the art if a new silica-free insulation is available that has a higher strength-to-weight ratio over conventional insulation products currently available in the market and which also has good mechanical and thermo-chemical stability at the operating temperatures. High strength-to-weight ratio ceramic components can be used in a wide range of applications due to their insulative properties. These applications can be in diesel particulate filters (DPF) as ceramic honeycomb structures, or diesel particulate filter frame materials, or DPF mount supports where lightweight and good strength are critical. Other applications can be ceramic hot gas filters, and supports or carriers for catalyst where tailored micro-porosity and strength is critical to their lifetime performance. It would be an improvement in the art to provide new alternative compositions that are lightweight, possess good hot strength, and which also provide flexibility in designing appropriate pore structures.

Traditional ceramic processing calls for sintering and machining of components after firing. For example, in solid oxide fuel cell insulation, significant machining is performed to obtain a tight insulation fit around the fuel cell stack. As a result, machining cost could be over 50% of the overall insulation cost. Similarly, high tolerance ceramic diesel particulate filters are prepared via extrusion followed by a high temperature sintering step which results in 10-20% shrinkage. In applications where high dimensional tolerances are required after firing, shrinkages of 10-120% need to be controlled very precisely, thus increasing the complexity and risk in the manufacturing processes. In contrast, net-shape and/or net-size processes could virtually eliminate these issues and minimize the concerns associated with firing shrinkage and post-machining steps. It would be an improvement in the art to develop a ceramic that can be net-shape and/or net-size. Such an improvement would significantly reduce the post-machining requirements and the associated costs.

Most commonly available high alumina insulation and refractory components have large sized pores (20 micron-500 micron). For a given total pore volume, larger pore sizes result in a less effective thermal insulator and decrease the component's overall strength. In fact, some of the best silica-based insulations have pore sizes in the nanometer range. However, due to the presence of silica, their maximum temperature use is often below 1000° C. and they cannot be used in reducing or humid environments. Furthermore, it is desired in the metal melting industry that the ceramic components and consumables have a fine pore size (<10 micron) since it improves the ceramic component's lifetime performance, i.e., a smaller pore limits the molten melt penetration into the ceramic liner surrounding the melt. But since the starting particle size of most the raw materials used to make refractory ceramic components is between 20 microns-500 microns, the corresponding pore sizes range from 10 micron-250 micron. Thus there is a need for high alumina insulation with superior thermal and lifetime performance, and it would be an improvement in the art to design very fine pores into the alumina matrix, analogous to the pore sizes observed in the silica-based insulation.

Conventional ceramic processing usually involves monolithic components where the bulk of the component just serves one functional purpose. However, multifunctional designs are slowly being realized as a growing trend in ceramics. Such multifunctional designs may include two or more layers where each layer exists for a specific purpose. For example, in the aluminum melting industry, the topmost layer in contact with the aluminum melt can be silicon carbide for good chemical inertness while the bottom layer can be alumina for good insulation. However, due to different thermal characteristics of individual ceramics, making such layered composite structures is often challenging. It would be an advancement in the art to provide a cost effective process to manufacture multi-layered ceramics components that have multifunctional properties.

The conventional method of making alumina-based phosphate-bonded products involves reacting a source of aluminum and phosphate at elevated temperatures, often above 100° C. The process requires heating the reactants to a high enough temperature (>100° C.) to initiate and propagate the reaction. As a result, the process requires expensive and specialized equipment making it somewhat difficult and inconvenient to manufacture phosphate-bonded products. One reason why high temperatures are needed is that the aluminum source, which is primarily alumina-based or aluminum hydroxide-based, consist of large grains (>10 micron to ≦500 micron) which are inert to the phosphate reagents at room temperature. Often, the reactant mixture simply consists of a mixture of alumina-based (or aluminum hydroxide-based) powder, a few other relevant inorganic ingredients as secondary phases, water and phosphate-based reagents (with minor amounts of shelf life preserving agents).

Such conventional approaches for manufacturing phosphate-bonded products predominantly exclude the use of organics in the form of organic dispersants, binders, or plasticizers. For example, dispersing the alumina-based slurry in solvent (prior to the addition of the phosphate-based reagent) and prior to the subsequent shaping processes, is not practiced in conventional methods of processing phosphate-bonded ceramics. The larger grains used in conventional approaches offer a further disadvantage that they are nearly impossible to disperse and have a strong tendency to settle out of the suspension thereby quickly nullifying any positive effects that organic dispersing aids might provide. Further, most ceramic powders consist of aggregates and agglomerates. The problem of agglomeration is especially more pronounced at lower particle sizes (1 micron to 20 micron).

If the powders agglomerate into hard-to-break aggregates and are in an un-dispersed state, then only the particles on the surface of the aggregate will react with the reagent. Consequently, the large grains, agglomerates of finer particles, and a poorly dispersed or hard to disperse ceramic suspension necessitate the use of significantly higher concentrations of phosphate-based reagent coupled with higher temperatures (>100° C.) or high energy mixing in order to achieve complete reaction with all the ceramic particles.

In conventional approaches of manufacturing phosphate-bonded alumina products, the molar ratio of aluminum to phosphorus is often 1:1 or lower (i.e., the reaction environment is significantly phosphate rich). Consumption, handling and disposal or phosphoric acid is an environmentally sensitive matter. It would, therefore, be an improvement in the art if phosphate-bonded reaction products can be made at lower temperatures and with much less phosphate-based reagents without sacrificing the desired properties of the final product.

BRIEF SUMMARY OF THE INVENTION

The present invention is based on a reaction-bonded, high alumina material and offers low cost net-shape ceramic processing of insulation products with superior performance in harsh environments. The present invention is directed to processes, methods, and systems for the production of insulation components made of ceramic. This invention further teaches a new method to make phosphate-bonded alumina-based products at lower temperatures (15° C.-<100° C.) requiring significantly less phosphate-based reagents.

One of the methods to improve the insulative properties of the insulation is to decrease the pore size of the ceramic component. By reducing the pore size, the overall heat transfer ability is reduced, thus making it a better insulator. For a given porosity, a smaller pore size provides a greater number of particle-to-particle contact points which leads to greater strength. Further, a reduced pore size will also limit the gas diffusion (permeability) or molten metal, glass, of slag penetration into the surrounding ceramic insulating component. The reduced permeability or melt penetration will extend the lifetime of the component compared to a ceramic component with a coarser pore size (ten to hundreds of microns). One aspect of the present invention is to achieve a very fine pore size (pore size range from 1 nanometer to 10 micron with a majority less than 1 micron) in the ceramic insulation component. This may be accomplished by judiciously choosing the starting raw materials and particularly the ceramic powder size (between about 1 micron and 10 microns) and the slip formulation.

The terms "slip" and "slurry" are often used interchangeably throughout the specification. In one embodiment of the process, the term "slurry" refers to the mixture of material prior to the addition of the phosphate containing reagent (including the phosphoric acid) and the term "slip" is used to reference the slurry mixed with the phosphate containing reagent (including the phosphoric acid).

Another aspect of the present invention is to increase the strength-to-weight ratio of the ceramic component by maintaining a fine porosity, using a fine starting powder particle size, and by adding an appropriate amount of phosphate component as the bonding phase. For a given total pore volume, the finer the pore size, the greater the number of particle-to-particle contact points, which produce a higher flexural strength. By increasing the flexural strength, the erosion and wear resistance properties can be markedly improved and the time to failure of the ceramic component will be extended.

Yet another aspect of the present invention is to improve the insulative properties of the ceramic material by adding an opacifier. The opacifier can be in the form of titania, aluminum phosphate, iron oxide, or other similar opacifiers known in the art.

Ceramic components made using this technology may have several unique properties: (i) mechanical 4-point bend strength of <1-150 MPa (<145-21,750 psi)—three to five times stronger than what is currently available in the form of structural, ceramic oxide-based insulation (with comparable fired densities); (ii) excellent erosion and wear resistance (higher strength is generally correlated with higher wear- and erosion-resistance); (iii) high temperature capability (the maximum service temperature can be as high as 1650° C.); (iv) excellent hot modulus of rupture strength, i.e., it retains its mechanical strength at high temperatures); (iv) longer lifetime/improved corrosion and chemical resistance (the ultrafine nano-, meso-, and micro-porosity will limit gas diffusion and molten metal/glass/black liquor/slag penetration into the ceramic insulation); (v) good insulation and thermal shock properties (thermal conductivity can range from 0.2-5.0 W/m·K (7.0-35.0 BTU·in/hr·ft$^2$·F—depending on the fired density)—its superior thermal shock resistance (along with nanoporosity and high strength) is expected to offer increased lifetime and superior performance in harsh environments; (vi) environmental and thermo-chemical stability (the material offers robust, stable performance in both oxidizing and reducing environments at high temperatures); (vii) Process flexibility & product availability: the material can be made available in various forms—castable mixes or powder pressed forms. This process flexibility allows the material to be available in a wide range of densities (0.6-3.5 g/cc, or, 37-217 lbs/cu. ft.) to suit the end user's needs—a lower density material, due to its lower thermal mass, can result in potential energy savings. On the other hand, the higher density version can be a good candidate for products where high strength or low permeability to gases is desired); (viii) design flexibility (functionally graded designs can be easily incorporated into the final products. For example, the porosity and chemical composition of the outer surface can be tailored to be different from that of inner bulk. Optionally, incorporating fibrous or particulate materials as mechanical reinforcements and infrared opacifants can also be achieved. Lastly, while the product is a high alumina (>95%), reaction bonded ceramic, it can have a second phase (<90 vol. %) in the form of mullite, zirconia, magnesia, iron oxide, chrome oxide, spinel, aluminum silicate, SiC, or if requested by the end user, silica-based too.

The material can be made available in a castable or a moldable form as a ceramic slip for conventional casting, of filter-pressing or as ceramic green feedstock for extrusion or injection molding. Thus the net-shaped and/or net-sized components can be formed in the green (pre-fired) stage. Such materials may provide low cost, one step processing, and under certain processing conditions may give net-shape or net-size components which will eliminate the need for post-machining processes. The proposed material system and method has also got a cost advantage over similar high alumina-based insulation available in the market.

Another aspect of the present invention is to provide composite phases or multifunctional features that are built into the ceramic structure. This can take the form of two or more layers with different properties that address different performance requirements. The topmost layer may serve one primary function, while the underlying middle or bottom layers can serve another function. Similarly, the ceramic components can be designed with internal macro- or micro-channels for various purposes, such as for gas flow or filtration. Additionally, a monolithic ceramic matrix with a composite structure containing two or more phases can also be designed for specific applications.

Another aspect of the present invention is the ability to manufacture phosphate-bonded ceramic components at room temperatures without any necessity for external heating.

Another aspect of the present invention is to teach a new process for making phosphate-based ceramic components by harnessing the benefits of dispersing the ceramic slips prior to the addition the phosphate-based reagent.

Yet another aspect of the present invention is the ability to use significantly less phosphate-based reagents thereby reducing the financial and environmental costs associated with the manufacture of this product.

These and other features and advantages of the present invention will become more fully apparent from the following figures, description, and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1A:
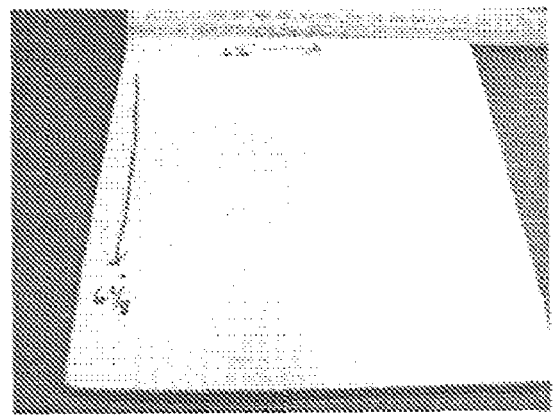
FIG. 1A is a photograph of a ceramic plate made using the material and methods of the present invention.

According to a method within the scope of the present invention, ceramic materials may be constructed according to the following process. In the first step, alumina powders are selected. Alumina powders suitable for use in the methods and materials of the present invention have a mean particle size of from about 1 micron to about 10 microns. In one embodiment, the powders have a mean particle size of between about 1 micron to about 5 microns. Any suitable alumina powders known to one of ordinary skill in the art or having a particle size falling within the above range may be suitable for use in the present invention. In some exemplary embodiments, the alumina powders may be selected from alumina, alpha-alumina, aluminum hydroxide, boehemite, pseudoboehemite, gamma-alumina, theta-alumina, bauxite, corundum, diaspore, or mixtures thereof. As used herein, the term "alumina powders" is meant to include the above list of ceramic powders. It should be appreciated that the alumina powders usable in the present invention are not limited to the previous list, and that such a listing is merely exemplary of suitable ceramic powders that provide a source of aluminum for use in the methods and materials within the scope of the present invention. The alumina powder is present from about 10%-75% by weight of slip.

Once a suitable aluminum-based ceramic powder has been selected, it may be dispersed in an organic or aqueous solvent or a mixture or organic and aqueous solvents using appropriate dispersants. Such dispersants are known to one of ordinary skill in the art, and may include, but are not limited to, ammonium polymethacrylate and PMMA. A finer starting alumina powder size (1 micron to 10 micron) is easier to disperse in a solvent medium. Through suitable choice of organics (e.g., dispersants) and processing steps these finer powders and the agglomerates can be broken up and dispersed into individual particles within a solvent medium. A high degree of dispersion allows each individual particle to be suspended and surrounded by a solvent medium. This makes it easier for the phosphate-based reagent molecules to come into contact with the aluminum source. As a result, the amount of phosphate-based reagent required for the reaction can be significantly reduced. In comparison, if the ceramic powders are clumped together into a hard-to-break agglomerates and are in an un-dispersed state, then only the particles on the surface of the agglomerates will react with the reagent. In this case, to achieve complete reaction with all the particles, significant concentration of phosphate-based reagent coupled with high energy mixing or higher temperatures (>100° C.) may be required to force the reagent into the pores of the aggregates or to break up the agglomerates. A dispersed suspension requires less water and less acid to make the slip workable compared to an un-dispersed suspension. While addition of dispersants is not absolutely necessary with finer powder sizes, it improves the overall quality and properties of the final product and makes the final slip more workable.

In some embodiments, the overall solids loading of the resulting mixture can range from about 6% by volume to about 70% by volume, but preferably within 20-60 vol. %. Organic binders and plasticizers can be added to impart green strength and handleability. Preservatives and biocides can be added to improve the shelf life of the final slip. Such binders, plasticizers, preservatives, and biocides are known to one of ordinary skill in the art. The total amount of organics added to the slurry may range from 0% to 25% by weight of the slip. To further aid the dispersing process, the powder and solvent may be milled together in the presence of a dispersant to achieve a more stable suspension. Possible milling techniques include, but are not limited to, jet milling, ball mailing, or paint-shaking.

A second phase may optionally be added to the above mixture to provide additional properties to the completed material. In some instances, this second phase may be an opacifier, a reinforcement phase, a viscosity thinning aid, a viscosity thickening aid, or a drying aid. Suitable second-phase materials may be organic or inorganic materials and may be provided in the form of fibers or powders selected from the family or carbides (such as SiC and $B_4C$), nitrides (such as $Si_3N_4$), borides, silicates, oxides, sulfates, aluminates, mixed oxides, mullite, silicon nitride, silicon carbide, zirconia, magnesia, spinel, chrome oxide, yttria, carbon, aluminosilicate, kyanite, clay, bentonite, sudaglass, iron oxide, glass frit, titania, perlite, zircon, alumina, glass, aluminum hydroxide vermiculite, aluminosilicates, silica, aluminum, iron, nickel, cobalt, palladium, tungsten, platinum, graphite, steel, zinc, copper, barium sulfate, zirconium diboride, calcium fluoride, pyrophillite, baddeleyite, magnesium, and heat resistant polymeric powders or fibers. Other second phases can include hollow or solid alumina spheres, zirconia spheres, fillite spheres, and silica spheres.

A reinforcement phase may be added for strength enhancement, improved toughness, shrinkage control, thermal expansion control, or superior damage tolerance. The amount of the reinforcement can range from 0%-60% by weight of slip, and may be added in chopped form and uniformly dispersed into the slurry. In one embodiment, the reinforcement fibers are randomly oriented within the slip. Fibers included as a reinforcement phase may have a length from 25 microns to 6 mm.

The second phase can be included in any suitable ratios to the mass of the primary ceramic. In some embodiments, the second phase is included in sufficient quantities to produce a range by volume of from about 0% to about 90% or between 0%-75% by weight of the slip.

Examples of possible viscosity thinning aids that may be added to the slip include, but are not limited to, liquids like methanol, solids like mullite (1-5 micron), and organic materials like glycerin. Possible drying aids include, but are not limited to, bentonite, magnesia (MgO), and glycerin. Viscosity thickening aids include, but are not limited to, bentonite, MgO, and agar. Typical binders to improve the green strength include, but are not limited to, agar, latex, aquazol, and PVA.

Yet another method within the scope of the present invention is the controlled formation of pores in ceramic materials. To the slips produced in any of the above methods may be added "pore-former" compositions that form pores in the ceramic material as it is manufactured. A pore-former composition may also act as a second phase in the ceramic. Suitable pore-forming compositions include, but are not limited to, synthetic compositions such as carbon (powder or fibers), polymer (powder of fibers), foam bubbles, mylar or natural ingredients like sucrose, sugar, salt, agar, microcellulose, or starch. The pore-forming phase can be added to the above slurry in the range of from about 0.1% to about 80% by volume or between 0%-45% by weight of the slip.

Sometimes, the ceramic powder and the additional ingredients discussed above have a multimodal particle size distribution in combination. In certain cases, a multimodal particle distribution may be present in the ceramic powder alone. In other cases, the ceramic powder may contain particles having substantially the same size, i.e. have a unimodal distribution. The ceramic powder and the additional ingredients discussed above may be milled to aid in dispersion, break up the particle agglomerates, or to achieve a specific particle size distribution.

In the next step, the resulting slip is mixed with a phosphate containing reagent to produce a final slip. Suitable phosphate reagents include, but are not limited to, monoaluminum phosphate, monoammonium, phosphate, diammonium phosphate, magnesium phosphate, or phosphoric acid. Phosphoric acid is a presently preferred choice. A large range of compositions having a variety of ratios is contemplated within the scope of the present invention. In some of these, the phosphate containing reagent is added to have a concentration of from about 1% to about 85%, but preferably within 7% to 55%. The phosphate containing reagent aids in the chemical reaction bonding of the ceramic powder.

Prior teachings in this area mention using a low molar ratio of aluminum to phosphate, typically in the range of 1.0 or lower, i.e., the reaction mixture is rich in phosphate. In the present invention, the amount of phosphate-containing reagent is significantly less than those disclosed in prior art. The molar ratio of total aluminum to total phosphorus from the reagent is between 4.0-65.0, significantly higher than what is commonly used. Since disposal of phosphate-based compounds is an environmental concern, using a lower amount of phosphate-based reagent results in lower financial and environmental cost associated with the final product.

The mixture is mixed with significant agitation or energy so that it provides optimum mixing of the ingredients, especially at high solids volume. The mixing can be performed using a high energy blender, dispersor, jet mill, vibratory mill, paint shaking, shear mixer, or a centrifugal-cum-rotational mixer. The mixing may be done without any need for an external heating. The mixing may be done at room temperature, although a slight increase in the slurry temperature is observed during and after the mixing process. If desired, the mixing can be done at any temperature between 15° C. and less than 100° C., but it is preferably done at the standard temperature conditions of the room where the mixing equipment is situated.

Following the preparation of the final slip or slurry, the prepared composition may be processed in a variety of ways for a variety of uses as known to one of ordinary skill in the art. In one method, the final slip may be cast or slip cast into a mold to produce a desired component. In another, the final slip may be filter-pressed to produce a desired component. In yet another method, the final slip may be injection molded after adding appropriate binders and organic additives known to one skilled in the art. In yet another example, the final slip may be extruded after adding appropriate binders and organic additives known to one skilled in the art.

In yet another method, the final slip may be dried using any of the methods known by one of skill in the art and subsequently crushed into a powder for later use. In still another, the final slip may be spray-dried into a powder. Powders produced from the final slip may then be processed using still other methods known to one of ordinary skill in the art, including, but not limited to, dry pressing, uniaxially or isostatically pressing, and/or injection molding to produce a desired final component. Parts resulting from such processes may be produced in a net-size, net-shape fashion. Powders resulting from this process can be referred to as phosphate-based or phosphate coated powders, since each particle or an agglomerate of particles has a phosphate coating around itself.

The phosphate-based powders, as well as all other powders produced using the methods of the invention disclosed herein may also be applied to surfaces by being sprayed. Such application results in a thin film layer of ceramic on the receiving surface.

In another method, a second phase may optionally be added to the above powder to provide additional properties to the completed material. In some instances, this second phase may be an opacifier, a reinforcement phase, or a pore-former. Suitable second-phase materials may be may be organic or inorganic materials and provided in the form of fibers or powders form selected from the family of carbides, nitrides, borides, silicates, oxides, sulfates, aluminates, mixed oxides, mullite, silicon nitride, silicon carbide, zirconia, magnesia, spinel, chrome oxide, yttria, carbon, aluminosilicate, kyanite, clay, bentonite, sudaglass, iron oxide, glass frit, titania, perlite, zircon, alumina, glass, aluminum hydroxide vermiculite, aluminosilicates, silica, aluminum, iron, nickel, cobalt, palladium, tungsten, platinum, graphite, steel, zinc, copper, barium sulfate, zirconium diboride, calcium fluoride, pyrophillite, baddeleyite, magnesium, and heat resistant polymeric powders or fibers. Some carbides, nitrides, and borides like SiC, $Si_3N_4$, and $B_4C$ may be suitable for their anti-wetting properties when in contact with molten metal. Some silicates like aluminum silicate can be used as an insulative filler. Certain oxides like titania may be suitable as an opacifying agent to enhance to the insulative properties. Other second phases can include hollow or solid alumina spheres, zirconia spheres, fillite spheres, and silica spheres. Fibers included as a reinforcement phase may have a length from 2.5 microns to 6 mm.

In another method, the ceramic phosphate coated powders can be resuspended in an aqueous or non-aqueous medium along with organics to cast, filter press, slip cast, extrude, or injection mold.

It will be appreciated that the ceramic materials within the scope of the present invention may be shaped or formed into various component shapes and configurations including, but not limited to, solid oxide fuel cell insulation, direct carbon fuel cell insulation, diesel particulate filters, filter frames for diesel particulate filters, porous ceramic filters for water or liquid filtration, components adapted for use in hot gas filtration, components adapted for use as a high temperature catalyst support, ceramic consumables in metal and glass melting applications, and ceramic plates incorporated into body armor. The ceramic materials may also be configured into various shapes, including but not limited to, structures with internal channels for gas flow and filtration, microchannel devices, electronic packaging substrates, and fiber optics/MEMS packaging applications, such as an opto-electronic packaging device.

First, the green ceramic piece may be dried at a temperature between 15° C.-150° C., but preferably between 22° C.-90° C. No special curing step is required prior to the firing step. The green part can be directly fired after it is fully dry. Lower temperatures, such as from 100° C. to 400° C., may be used where the ceramic material is applied on a substrate that lacks heat resistance, such as an organic substrate. Higher temperatures, such as from 600° C. to 1000° C. may be used in the fabrication of certain insulation components, such as fuel cell components. The highest heat treatment temperatures, such as between 1000° C. to 1650° C., may be required for ceramic components used in metal or glass melting applications, diesel filters, and body armor applications. The heat treatment temperature can affect desired density and shrinkage of the final ceramic component. For heat treatment temperatures below 1200° C., there is negligible shrinkage. Thus, net-shape and net-size components can be made using this technique. At heat treatment temperatures up to 1200° C., there may be 0% to 2% shrinkage and greater shrinkage occurring at higher temperatures.

As used herein, the term "net-shape" means that the ceramic component after heat treatment has the same shape as the green component or the component prior to heat treatment. In most cases a net-shape component will not require post machining. As used herein, the term "net-size" means that the ceramic component after heat treatment has less than about 2% shrinkage compared to the green component or the component prior to heat treatment.

While specific embodiments of the present invention have been illustrated and described, numerous modifications come to mind without significantly departing from the spirit of the invention, and are thus included within its scope.

Multi-Layered Ceramic Components

Multilayered ceramic components may be produced using the compounds and techniques of the present invention to provide unitary components having multiple layers. Such techniques may be used to provide, for example, a component having an outer layer with a controlled porosity and an internal layer providing strength. Many other combinations are possible within the scope of the present invention. The above multilayer concept can be used for multifunctional ceramic products. The multiple ceramic layers can be chosen selectively to give different porosities, strength, toughness, damage tolerance, thermal conductivity, corrosion resistance, electrical properties, chemical resistance, and thermal shock properties.

According to these methods within the scope of this invention, two or more different types of slips are made. The first slip is made according to the procedures listed above. The second and other additional slips are produced by combining two or more ceramic powders or fibers selected from the groups discussed above. More specifically, the two or more components consisting of ceramic powders of the desired material composition are first selected. For these second and additional slips, the powders can have a particle size of from about 0.010 microns to about 2000 microns. The fibers can have a size of from about 25 microns to about 6 mm. As above, the powders or fibers may be selected from carbides (such as SiC, $B_4C$), nitrides (such as $Si_3N_4$), borides, silicates, oxides, sulfates, aluminates, mixed oxides, mullite, silicon nitride, silicon carbide, zirconia, magnesia, spinel, chrome oxide, yttria, carbon, aluminosilicate, kyanite, clay, bentonite, sudaglass, iron oxide, glass frit, titania, perlite, zircon, alumina, glass, aluminum hydroxide vermiculite, aluminosilicates, silica, aluminum, iron, nickel, cobalt, palladium, tungsten, platinum, graphite, steel, zinc, copper, barium sulfate, zirconium diboride, calcium fluoride, pyrophillite, baddelcyite, magnesium, and any other ceramic powder known to one of ordinary skill in the art as discussed above. The mixture of individual constituents can range from about 0.1% by volume to about 70% by volume of the slip.

The first layer may be first cast using the first slip using methods known to one of ordinary skill in the art, followed by the application of the second layer using the second slip having a phase shared with the first layer. Additional layers may then be added following similar principles prior to sintering of the ceramic. As a result, products having two or more layers may be formed. In some, a first layer includes a single ceramic powder, and the second layer includes at least the powder of the first layer and one other powder or fiber. Subsequent layers could similarly include the powder of the first layer or the other powder or fiber, plus a new ceramic powder or fiber. Alternatively, the first layer could comprise first and second ceramic powders, while the second layer includes only one of either the first or second ceramic powders. A third layer could then include the selected first or second powder found in the second layer and another powder, potentially even that of the first layer. One of ordinary skill in the will understand that these combinations are only exemplary of the many variations that are contemplated as within the scope of the present invention, and as a result, these examples are not limiting in any fashion.

The following examples are given to illustrate various embodiments within the scope of the present invention. These are given by way of example only, and it is understood that the following examples are not comprehensive or exhaustive of the many types of embodiments of the present invention that can be prepared in accordance with the present invention.

EXAMPLE 1

Figure 1B:
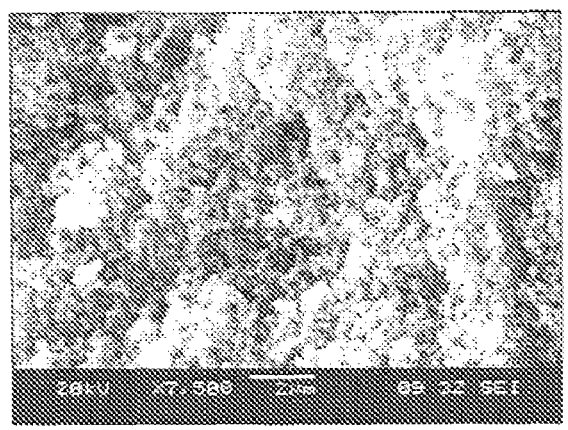
FIGS. 1B and 1C are two photomicrographs of its internal microstructure taken at 7500X and 30000X magnification, respectively.
Figure 1C:
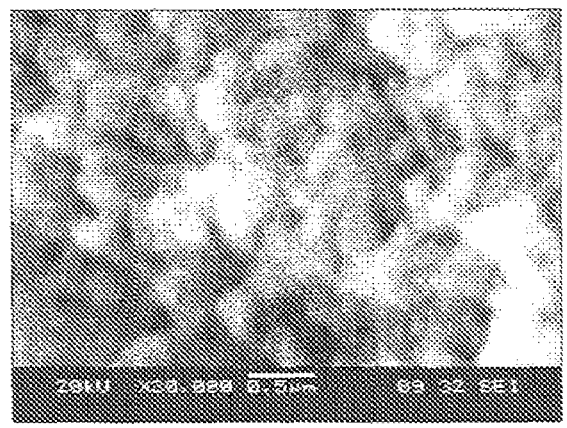

High purity (99.99%) alumina powder (with low surface area) having an average particle size of 2 μm was suspended in water using dispersants, binders, and plasticizers at 18 vol % solids. The suspension was paint-shaken with a small amount of alumina media to improve and speed up the dispersion process. A pore-former in the form of carbon was added at three different levels (i) 60 vol. %; (ii) 40 vol. %; and (iii) 0 vol. %. Phosphoric acid was added to the mix to obtain the final slip. The resulting slurry was poured into the mold, dried and fired to 800° C. The resulting insulation material with 60 vol. % pore-former is illustrated in FIGS. 1A-1C. Table I below summarizes the sample properties.

TABLE I

| Properties for Sample with 60 vol. % pore-former | Value |
| --- | --- |
| Density (g/cc) | 0.80 g/cc |
| Flexural Strength (MPa) | <1 MPa |
| Thermal Conductivity (W/m · K) at 800° C. | 0.3 W/m · K |

Figure 2:
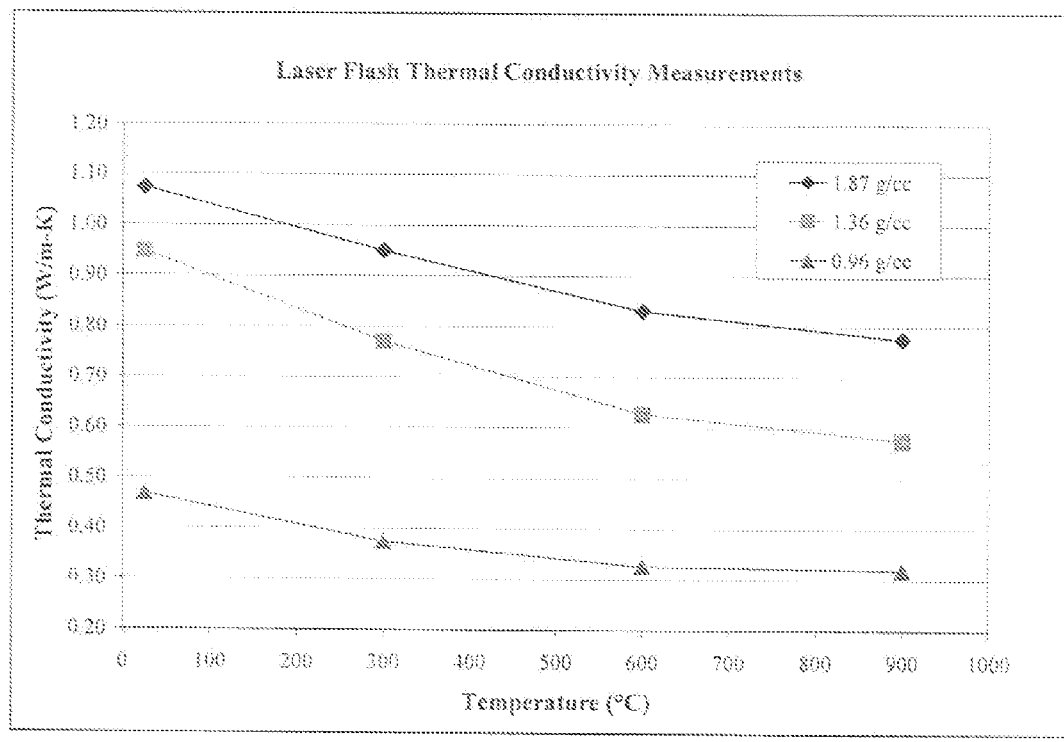
FIG. 2 includes a chart illustrating the thermal conductivity of components having different densities made using the processes and materials within the scope of the present invention.
Figure 3:
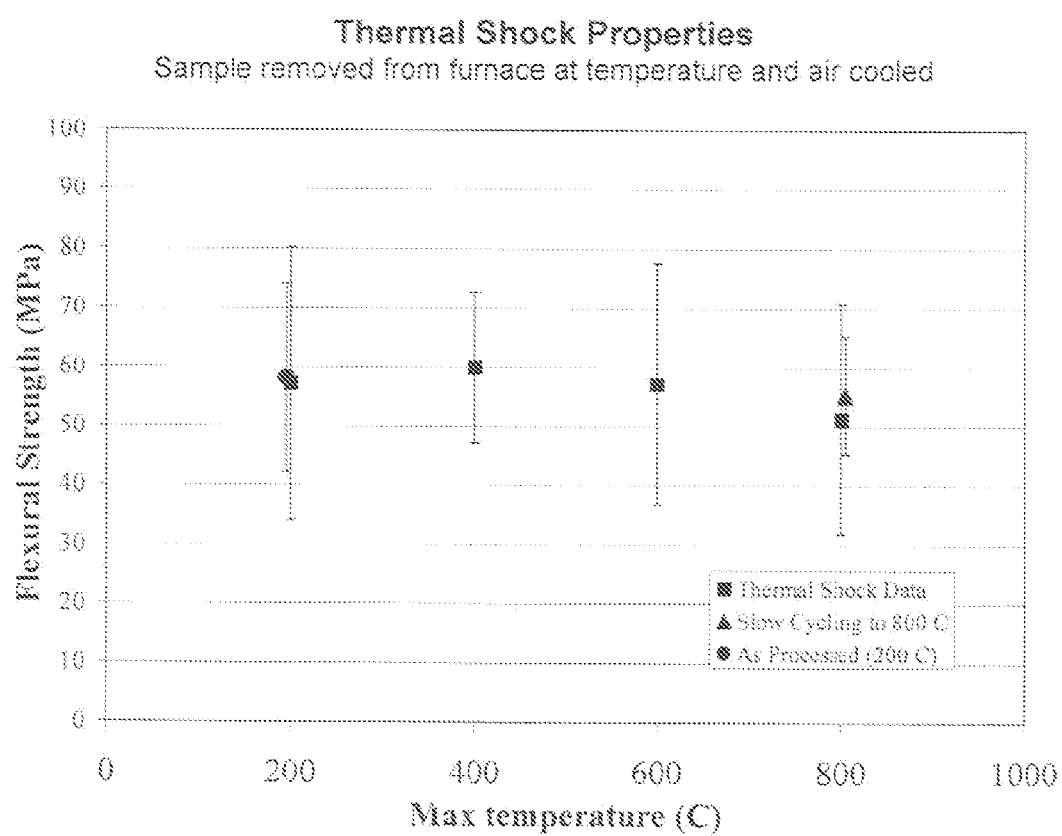
FIG. 3 includes a chart illustrating the thermal shock properties of components made using the processes and materials within the scope of the present invention.

This technique allows for incorporating very fine porosity (≦1 micron) into the ceramic matrix thus making it a very effective insulation. The porosity is in the nano-, meso-, and micro- range, as is seen in FIGS. 1A-1C. The above sample has low thermal conductivity (FIG. 2), and good thermal shock properties (FIG. 3). As the pore-former content increases, the density decreases and correspondingly a decrease in thermal conductivity is observed.

EXAMPLE 2

High purity alumina powder with an average particle size of 5 μm was suspended in water using dispersants, binders, and plasticizers at 45 vol. % solids. Dispersants, binders, and plasticizers were added in the range of 9.0 wt. % to obtain a fully dispersed slurry with low viscosity (<1000 cP). Phosphoric acid was added and the slurry was intimately mixed at room temperature using a mixer. No external heating was applied during the mixing process. While mixing the slurry with the acid, a modest temperature increase was observed as a result of the mixing process. The ratio of the weight of acid to total weight of all alumina-based solids was less than 1.0. The slurry was then poured into a desired mold and allowed to dry in an oven at 40° C. The drying temperature can range from room temperature to 100° C. but preferably between 22° C.-70° C. The green component, after drying, was fired at a temperature of about 900° C. for 12 hours.

Table II below outlines the strength as a function of firing temperature. The data suggests a high strength-to-weight ratio for an alumina ceramic component.

TABLE II

| Firing Temperature for Example 2 | 800° C. | 900° C. | 1000° C. |
| --- | --- | --- | --- |
| Density (g/cc) | 2.3 | 2.3 | 2.3 |
| Flexural Strength (MPa) | 19 | 21 | 20 |

EXAMPLE 3

Figure 4:
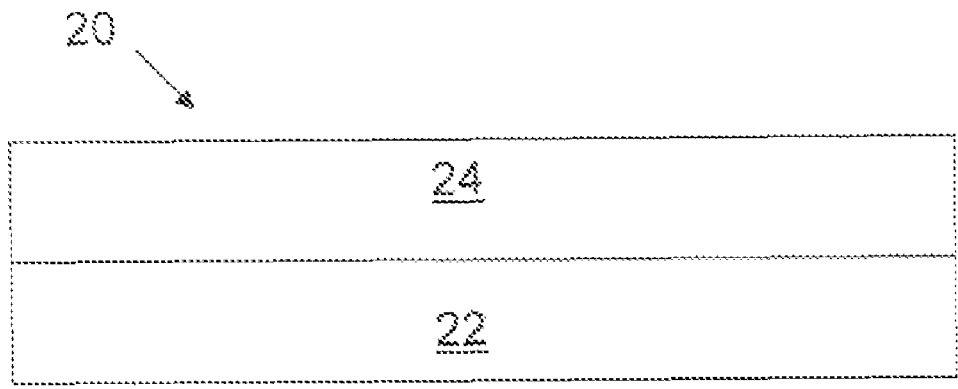
FIG. 4 is a schematic of a multifunctional insulation design with different layers having different chemical compositions, different phases, and densities.

A slip is made according to the procedure of Example 2. A portion of the 100% alumina slip is poured into the mold and left to dry. A quantity of silicon carbide powders is added to the leftover portion of the alumina slip in an amount of about 50 vol. %. This second alumina-silicon carbide (50/50) (by volume) slip is then poured on top of the first alumina cast sample and left to dry. A schematic of the multilayered final product 20 using this technique is shown in FIG. 4. The multilayered product 20 has two layers—bottom layer 22 is 100% alumina, while the top layer 24 is a 50/50 mixture of alumina and silicon carbide. It will be appreciated that this technique may be used to prepare multilayered insulation having a variety of different compositions and properties.

EXAMPLE 4

Figure 5:
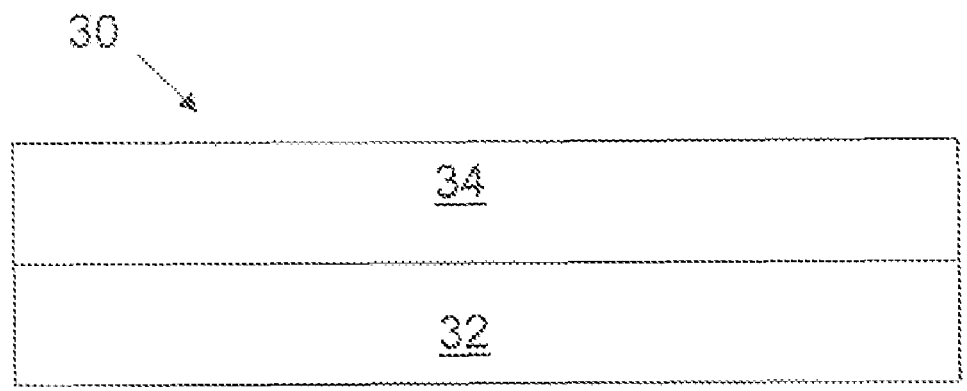
FIG. 5 is a schematic of a multifunctional insulation design with different layers having different total porosity with different thermal conductivity and strength values.

A slip is made according to the procedure of Example 2. The slip is poured into the mold and left to dry. A second batch of slip is made as described in Example 1. It is then poured on top of the first alumina cast. A schematic of the multilayered final product 30 using this technique is shown in FIG. 5. The multilayered product has two layers—bottom layer 32 is 100% alumina, while the top layer 34 is a 40/60 mixture of alumina and a pore-former which will burn off during firing to give a multilayer dense-porous structure.

EXAMPLE 5

Figure 6A:
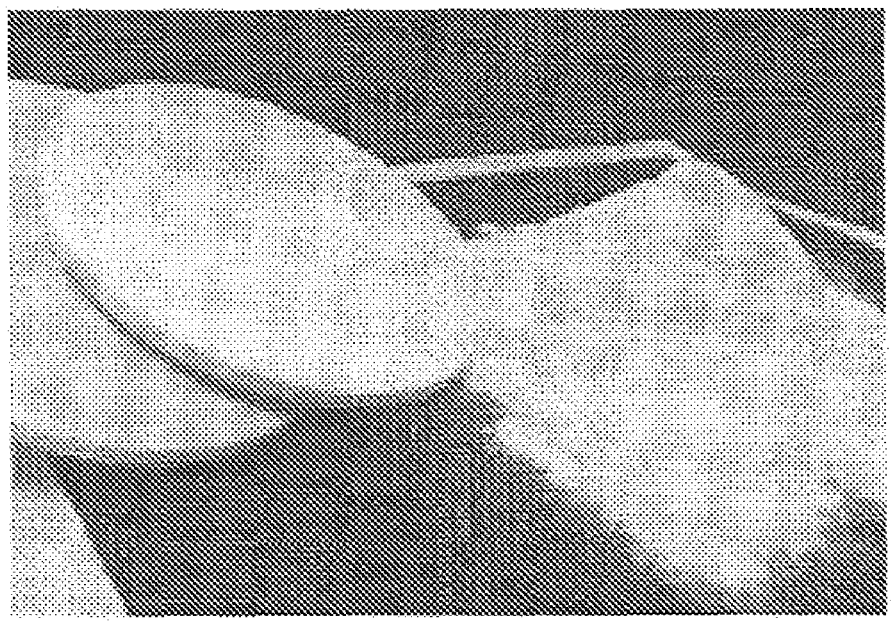
FIGS. 6A and 6B illustrate the phosphate-bonded alumina powder produced by a drying process such as spray drying and different shapes (cylindrical tube, disc) made from this powder using isostatic pressing.

A slip was made according to the procedure of Example 2. The slip was then spray dried using a spray drier to produce a fine powder which has alumina at the core with a phosphate coating on the outside. The fine powder was then isostatically pressed at 30,000 psi into slabs and cylindrical tubes and fired to 800° C. FIG. 6A shows the finer powder and a pressed disk.

Figure 6B:
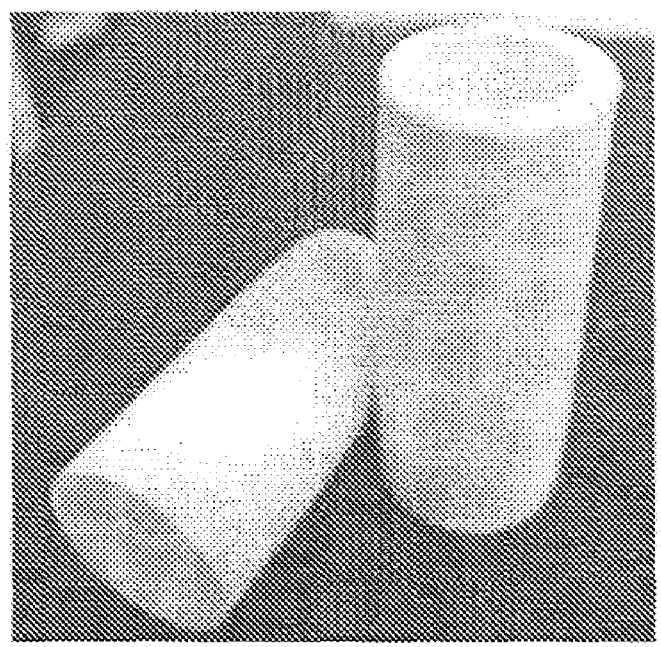

FIG. 6B shows cylindrical tubes formed by isostatically pressing the powder. The fired density and final flexural strength of the ceramic component was 2.2 g/cc and 10 MPa, respectively. No shrinkage was observed after firing to 800° C. Thus, net-shaped and net-sized components may be successfully made according to processes within the scope of the present invention.

EXAMPLE 6

A slip is made according to the procedure of Example 2. Mullite (30 vol. %) is added as a second phase to improve strength, lower the slip viscosity, lower the coefficient of thermal expansion (CTE) of the post-fired product, and increase its thermal shock properties. The final slip is poured into the mold, dried and fired to 800° C. Mullite addition lowers the viscosity of the cast slip by about 30% and increases the final, fired strength of the ceramic component by >10%.

EXAMPLE 7

A slip is made according to the procedure of Example 2. To this slip, a large amount of glycerin, up to 15 wt. %, is added as a plasticizer. The resulting slip is left to dry at room temperature. After about 80% of the moisture is lost, the semi-dry cast behaves like putty and has a clay-like consistency that can be molded into a desired shape under appropriate pressure.

EXAMPLE 8

Two different alumina powders with an average individual particle size ratio of approximately 1:10 were mixed and suspended in water using dispersants, binders, and plasticizers. Dispersants, binders, and plasticizers were added in the range of 5.0 wt. % to get a low viscosity (<1000 cP) slurry. Phosphoric acid was added to the slurry and the slip was mixed at room temperature to obtain a final slip. The slurry was then poured into a desired mold and allowed to dry. The sample was dried at about 24° C. The green component, after drying, was fired to a temperature of 800° C., 900° C. and 1000° C. to obtain the desired density. For firing temperatures below 1200° C. there was negligible shrinkage, resulting in net-shaped and net-sized components. Table III below outlines the strength of this sample as a function of firing temperature.

TABLE III

| Firing Temperature for Example 8 | 800° C. | 900° C. | 1000° C. |
| --- | --- | --- | --- |
| Density (g/cc) | 2.70 | 2.70 | 2.70 |
| Flexural Strength (MPa) | 79 | 73 | 74 |

EXAMPLE 9

Figure 7:
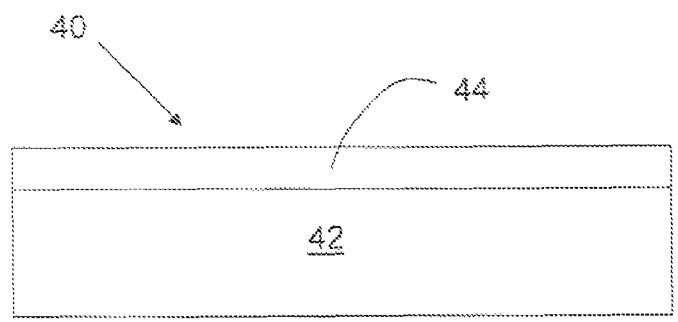
FIG. 7 is a schematic of a multifunctional insulation design with a protective coating (with fine porosity) made using the current invention and applied on top of a commercially available ceramic component.

A slip is made according to the procedure of Example 2. The slip is then coated onto another porous ceramic substrate. The top coat can have a thickness ranging from 10 micron to 100 mils. The porosity in the top coat is finer than the porosity of the underlying substrate. This allows for increased thermal and chemical protection of the substrate component. A schematic of the multilayered final product 40 using this technique is shown in FIG. 7. The multilayered product has two layers—bottom layer 42 provides bulk strength and insulation properties, while the top layer 44 is thin, protective coating with appropriate thermo-chemical stability.

EXAMPLE 10

Figure 8A:
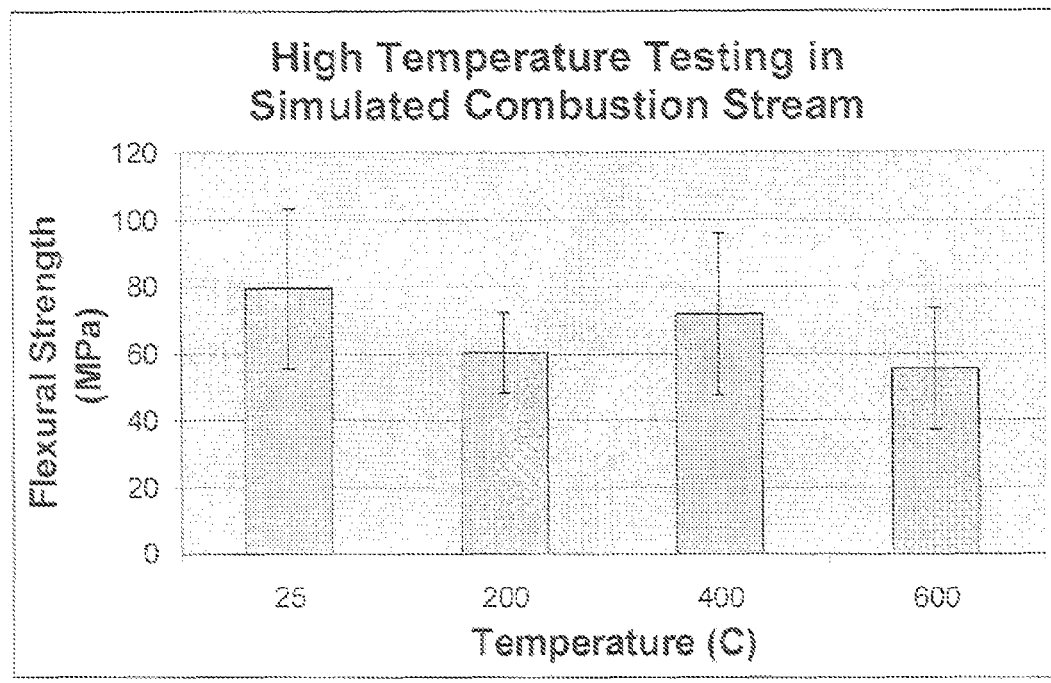
FIGS. 8A and 8B include two charts illustrating the high temperature flexural strength of bars made using the processes and materials within the scope of the present invention in air and in a simulated combustion stream.
Figure 8B:
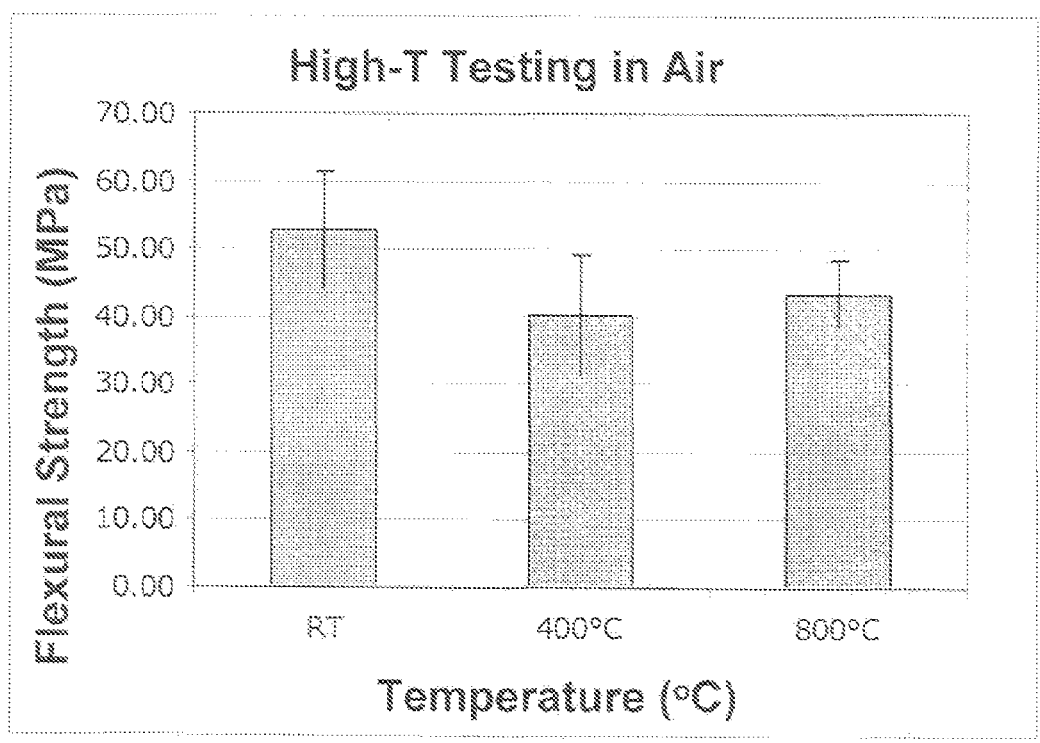

A slip was made according to the procedure of Example 2. To this slip, chopped alumina fibers (10 wt. %) were added. Fiber addition improves the fracture toughness of the fired component since the fibers act as reinforcements and sites for crack deflection. After firing the 4-point flexural strength increased by at least greater than 10%. FIGS. 8A and 8B show the high temperature properties of samples (after 800° C. firing) containing up to 10 wt. % alumina fibers. No significant degradation in strength was seen in either oxidizing or reducing atmospheres.

EXAMPLE 11

A slip is made according to the procedure of Example 2. In this case, the powders have a very high surface area (50-400 m$^2$/g) and may include one or more powders from a group of alumina, aluminum hydroxide, boehmite, or pseudobohmite. An appropriate amount of dispersant was added to evenly disperse the powder particles before adding the phosphoric acid. The resulting product has a density of 0.7 g/cc after firing 900° C. or 1100° C. and it also has a very low thermal conductivity. The pore size exists in the nano-to-micron sizes with over 35% of the pores below 100 nm. The thermal conductivity of the sample was between 0.2-0.3 W/mK at 600° C.

EXAMPLE 12

Powders were made according to the procedure of Example 5. To the dried powder 15 wt. % aluminum metal powder was added. The two ingredients were thoroughly dry mixed in a bottle and then pressed into pellets at 1000 lbs. The sample after 1550° C. firing exhibited no shrinkage and had a flexural strength greater than 10 MPa. The fired sample density was 1.87 g/cc. Thus near net-shape and near-net size components were obtained after a 1550° C. fire.

EXAMPLE 13

A slip was made according to the procedure of Example 2. To this slip, 70 wt. % chopped alumina fibers were added with respect to the alumina powder. The slip was paint shaken for 1 hour to disperse the fibers following which phosphoric acid was added. The slip is poured into the mold and left to dry. A second batch of slip was made as described in Example 2 with 0% fibers. It was then poured on top of the first cast, dried and fired to 1550° C. A schematic of the multilayered final product 30 using this technique is shown in FIG. 5. The multilayered product has two layers—bottom layer 32 is 30% alumina (powder)-70% alumina fiber, while the top layer 34 is a 100% alumina (powder)-0% fiber.

It will be appreciated hat the methods and compositions of the instant invention can be incorporated in the form of a variety of embodiments, only a few of which are disclosed herein. It will be apparent to the artisan that other embodiments exist and do not depart from the spirit of the invention. Thus, the described embodiments are illustrative and should not be construed as restrictive.

The invention claimed is:

1. A process for making a ceramic component comprising:
obtaining a slurry comprising
a quantity of ceramic powder having a mean particle size from about 1 micron to about 10 microns dispersed in water or a mixture of water and non-aqueous solvents; wherein the ceramic powder is present from about 10%-75% by weight of slurry; the ceramic powder being selected from the group consisting of alumina, alpha-alumina, boehmite, pseudoboehmite, diaspore, bauxite, beta-alumina, theta-alumina, gamma-alumina, and aluminum hydroxide;
a quantity of fiber from about 0%-60% by weight of slurry, as a reinforcement phase;
a quantity of pore-former, from about 0%-45% by weight of slurry;
a quantity of second phase, from about 0%-75% by weight of slurry, wherein the second phase is in the form of fibers or powders selected from the group consisting of carbides, nitrides, borides, silicates, oxides, sulfates, aluminates, mixed oxides, mullite, zirconia, magnesia, spinel, chrome oxide, yttria, carbon, aluminosilicate, kyanite, clay, bentonite, sudaglass, iron oxide, glass frit, titania, perlite, zircon, vermiculite, silica, aluminum, iron, steel, zinc, copper, barium sulfate, zirconium diboride, calcium fluoride, pyrophillite, baddeleyite, magnesium, heat resistant polymeric powders or fibers, and hollow or solid alumina spheres, zirconia spheres, fillite spheres, and silica spheres;
a quantity of one or more organic additives selected from a group of organic dispersants, binders, plasticizers, drying aids, molding aids, preservatives, biocides, viscosity thinning aids, or viscosity thickening aids, from about 0% to 25% by weight of slurry;
mixing the slurry with a phosphoric acid to produce a slip such that the molar ratio of total aluminum to total phosphorus from the phosphoric acid is between 8 and about 65 and wherein the slip is mixed at a temperature between 15° C. and less than 100° C.;
pouring the slip into a mold to form a green component by a process including chemical reaction bonding of the ceramic powder under the influence of said phosphoric acid; and
applying a heat treatment to the green component.

2. The process of claim 1, wherein the mean particle size of the ceramic powder is from about 1 micron to about 5 microns.

3. The process of claim 1, wherein the step of pouring the slip into a mold includes applying at least one of heat and pressure.

4. The process of claim 1, wherein the green component is dried at a temperature between 15° C. and 150° C.

5. The process of claim 1, wherein the heat treatment is applied at a temperature between 100° C. and 1650° C.

6. The process of claim 1, wherein the ceramic powder has a surface area between 0.01 $m^2$/g and 400 $m^2$/g.

7. The process of claim 1, wherein the non-aqueous solvent is selected from the group consisting of ethanol, methanol, propanol, butanol, isopropyl alcohol, hexane, acetone, benzene, and toluene.

8. The process of claim 1, wherein the slurry has a solids loading between about 4% by volume and about 70% by volume.

9. The process of claim 1, wherein the ceramic powder comprises one of a unimodal and a multimodal particle size distribution.

10. The process of claim 1, wherein the second phase comprises a powder having one of a unimodal and a multimodal particle size distribution with a mean particle size from about 0.010 microns to about 200 microns.

11. The process of claim 1, wherein the second phase comprises fibers having a length from 25 microns to 6 mm.

12. The process of claim 1, wherein the second phase is operative to modify a physical property of the ceramic component, the physical property being selected from the group consisting of: porosity, coefficient of thermal expansion, electrical conductivity, thermal conductivity, ionic conductivity, toughness, strength, Young's modulus, and damage tolerance.

13. The process of claim 1, wherein the second phase is selected from the group consisting of an opacifier; a reinforcement phase; a viscosity thickening aid; a viscosity thinning aid; and a drying aid.

14. The process of claim 1, wherein the slurry comprises a pore-former composition selected from the group consisting of carbon powders, carbon fibers, polymeric powders, polymeric fibers, foam bubbles, mylar, sucrose, sugar, salt, agar, microcellulose, and starch.

15. The process of claim 1, wherein the slurry comprises a pore-former and the amount of pore-former compared to the amount of ceramic powder in the slurry is in the range of 0.01% to about 80% by volume.

16. The process of claim 1, wherein the organic additives are present in an amount between 0.001% and 25% by weight of the slurry.

17. The process of claim 1, wherein the ceramic component after applying the heat treatment has substantially the same net shape compared to the green component prior to heat treatment.

18. The process of claim 1, wherein the fibers have a length from about 24 microns to about 6 millimeters.

19. The process of claim 1, wherein the fibers are randomly oriented within the slurry.

20. The process of claim 1, wherein the heat treated component comprises a density ranging between about 1.8 g/cc and about 2.7 g/cc.

21. The process of claim 1, wherein the molar ratio of total aluminum to total phosphorus from the phosphoric acid is between about 10 and about 25.

22. A process for making a ceramic component comprising:
obtaining a slurry comprising
a quantity of ceramic powder having a mean particle size from about 1 micron to about 10 microns dispersed in water or a mixture of water and non-aqueous solvents; wherein the ceramic powder is present from about 10%-75% by weight of slurry; the ceramic powder being selected from the group consisting of alumina, alpha-alumina, boehmite, pseudoboehmite, bauxite, beta-alumina, diaspore, theta-alumina, gamma-alumina, or aluminum hydroxide;
a quantity of fiber, as a reinforcement phase having a length from about 25 micron to 6 mm, from about 0%-60% by weight of slurry, uniformly dispersed into the slurry;
a quantity of pore-former, from about 0%-45% by weight of slurry;
a quantity of second phase, from about 0%-75% by weight of slurry, wherein the second phase is in the form of fibers or powders selected from the group consisting of carbides, nitrides, borides, silicates, oxides, sulfates, aluminates, mixed oxides, mullite, zirconia, magnesia, spinel, chrome oxide, yttria, carbon, aluminosilicate, kyanite, clay, bentonite, sudaglass, iron oxide, glass frit, titania, perlite, zircon, vermiculite, silica, aluminum, iron, steel, zinc, copper, barium sulfate, zirconium diboride, calcium fluoride, pyrophillite, baddeleyite, magnesium, heat resistant polymeric powders or fibers, and hollow or solid alumina spheres, zirconia spheres, fillite spheres, and silica spheres;

a quantity of one or more organic additives selected from a group of organic dispersants, binders, plasticizers, drying aids, molding aids, preservatives, biocides, viscosity thinning aids, or viscosity thickening aids, from about 0% to 25% by weight of slurry;

mixing the slurry with a phosphoric acid to produce a slip such that the molar ratio of total aluminum to total phosphorus from the phosphoric acid is between 8 and about 65 and wherein the slurry is mixed at a temperature between 15° C. and less than 100° C.;

drying the slip;

obtaining a dried powder from the slip, wherein the dried powder has a mean particle size from 0.2 micron to 1000 micron;

shaping the dried powder into a desired form; and applying a heat treatment to the desired form.

23. The process of claim 22, wherein the dried powder is shaped into the desired form by a form shaping process selected from the group consisting of injection molding, extrusion molding, filter pressing, isostatic pressing, and uniaxial pressing.

24. The process of claim 22, wherein the slurry comprises at least two ceramic powders or fibers.

25. The process of claim 22, wherein the slurry comprises at least two metal powders of fibers.

26. The process of claim 22, wherein the dried powder, prior to shaping, is mixed with at least one of metal and ceramic powders or fibers.

27. The process of claim 22, wherein the ceramic component after applying the heat treatment has the same net shape compared to the desired form prior to heat treatment.

28. The process of claim 22, wherein the heat treated form comprises a density ranging between about 1.8 g/cc and about 2.7 g/cc.

29. The process of claim 22, wherein the molar ratio of total aluminum to total phosphorus from the phosphoric acid is between about 10 and about 25.

30. A process for making a ceramic component comprising:

obtaining a slurry comprising a quantity of ceramic powder having a mean particle size from about 1 micron to about 10 microns dispersed in water or a mixture of water and non-aqueous solvents; wherein the ceramic powder is present from about 10%-75% by weight of slurry; the ceramic powder being selected from the group consisting of alumina, alpha-alumina, boehmite, pseudoboehmite, diaspore, bauxite, beta-alumina, theta-alumina, gamma-alumina, or aluminum hydroxide;

a quantity of second phase, from about 0.01%-75% by weight of slurry, wherein the second phase is in the form of fibers or powders selected from the group consisting of carbides, nitrides, borides, silicates, oxides, sulfates, aluminates, mixed oxides, mullite, zirconia, magnesia, spinel, chrome oxide, yttria, carbon, aluminosilicate, kyanite, clay, bentonite, sudaglass, iron oxide, glass frit, titania, perlite, zircon, vermiculite, silica, aluminum, iron, steel, zinc, copper, barium sulfate, zirconium diboride, calcium fluoride, pyrophillite, baddeleyite, magnesium, heat resistant polymeric powders or fibers, and hollow or solid alumina spheres, zirconia spheres, fillite spheres, and silica spheres;

a quantity of one or more organic additives selected from a group of organic dispersants, binders, plasticizers, drying aids, molding aids, preservatives, biocides, viscosity thinning aids, or viscosity thickening aids, from about 0.001% to 25% by weight of slurry;

mixing the slurry with a phosphoric acid to produce a slip such that the molar ratio of total aluminum to total phosphorus from the phosphoric acid is between 8 and about 65 and wherein the slip is mixed at a temperature between 15° C. and less than 100° C.;

pouring the slip into a mold to form a green component by a process including chemical reaction bonding of the ceramic powder under the influence of the phosphoric acid; and applying a heat treatment to the green component.

31. The process of claim 30, further comprising milling the slip to aid in dispersing the ceramic powder and second phase in the slip.

32. The process of claim 30, wherein the heat treated component comprises a density ranging between about 1.8 g/cc and about 2.7 g/cc.

33. The process of claim 30, wherein the molar ratio of total aluminum to total phosphorus from the phosphoric acid is between about 10 and about 25.

34. A process for making a ceramic component comprising:

obtaining a slurry comprising a quantity of ceramic powder having a mean particle size from about 1 micron to about 10 microns dispersed in water or a mixture of water and non-aqueous solvents; wherein the ceramic powder is present from about 10%-75% by weight of slurry; the ceramic powder being selected from the group consisting of alumina, alpha-alumina, boehmite, pseudoboehmite, diaspore, bauxite, beta-alumina, theta-alumina, gamma-alumina, or aluminum hydroxide;

a quantity of fiber, as a reinforcement phase having a length from about 25 micron to 6 mm, from about 0.01%-60% by weight of slurry, added in chopped form and uniformly dispersed into the slurry;

a quantity of pore-formed, from about 0.01%-45% by weight of slurry;

a quantity of second phase, from about 0.01%-75% by weight of slurry, wherein the second phase is in the form of fibers or powders selected from the group consisting of carbides, nitrides, borides, silicates, oxides, sulfates, aluminates, mixed oxides, mullite, zirconia, magnesia, spinel, chrome oxide, yttria, carbon, aluminosilicate, kyanite, clay, bentonite, sudaglass, iron oxide, glass frit, titania, perlite, zircon, vermiculite, silica, aluminum, iron, steel, zinc, copper, barium sulfate, zirconium diboride, calcium fluoride, pyrophillite, baddeleyite, magnesium, heat resistant polymeric powders or fibers, and hollow or solid alumina spheres, zirconia spheres, fillite spheres, and silica spheres;

a quantity of one or more organic additives selected from a group of organic dispersants, binders, plasticizers, drying aids, molding aids, preservatives, biocides, viscosity thinning aids, or viscosity thickening aids, from about 0.001% to 25% by weight of slurry;

mixing the slurry with a phosphoric acid to produce a slip such that the molar ratio of total aluminum to total phosphorus from the phosphoric acid is between 8 and about 65 and wherein the slip is mixed at a temperature between 15° C. and less than 100° C.;

pouring the slip into a mold to form a green component by a process including chemical reaction bonding of the ceramic powder under the influence of the phosphoric acid; and applying a heat treatment to the green component.

35. The process of claim 34, wherein the heat treated component comprises a density ranging between about 1.8 g/cc and about 2.7 g/cc.

36. The process of claim 34, wherein the molar ratio of total aluminum to total phosphorus from the phosphoric acid is between about 10 and about 25.

37. A process for making a ceramic component comprising:

obtaining a slurry comprising
a quantity of ceramic powder having a mean particle size from about 1 micron to about 10 microns dispersed in water or a mixture of water and non-aqueous solvents; wherein the ceramic powder is present from about 10%-75% by weight of slurry; the ceramic powder being selected from the group consisting of alumina, alpha-alumina, boehmite, pseudoboehmite, diaspore, bauxite, beta-alumina, theta-alumina, gamma-alumina, and aluminum hydroxide;

a quantity of fiber from about 1%-60% by weight of slurry, as a reinforcement phase;

a quantity of second phase, from about 1%-75% by weight of slurry, wherein the second phase is in the form of fibers or powders selected from the group consisting of carbides, nitrides, borides, silicates, oxides, sulfates, aluminates, mixed oxides, mullite, zirconia, magnesia, spinel, chrome oxide, yttria, carbon, aluminosilicate, kyanite, clay, bentonite, sudaglass, iron oxide, glass frit, titania, perlite, zircon, vermiculite, silica, aluminum, iron, steel, zinc, copper, barium sulfate, zirconium diboride, calcium fluoride, pyrophillite, baddeleyite, magnesium, heat resistant polymeric powders or fibers, and hollow or solid alumina spheres, zirconia spheres, fillite spheres, and silica spheres;

a quantity of one or more organic additives selected from a group of organic dispersants, binders, plasticizers, drying aids, molding aids, preservatives, biocides, viscosity thinning aids, or viscosity thickening aids, from about 1% to 25% by weight of slurry;

mixing the slurry with a phosphate containing reagent to produce a slip such that the molar ratio of total aluminum to total phosphorus from the reagent is between 8 and about 65 and wherein the slurry is mixed at a temperature between 15° C. and less than 100° C.;

pouring the slip into a mold to form a green component by a process including chemical reaction bonding of the ceramic powder under the influence of said reagent; and applying a heat treatment to the green component.

38. The process of claim 37, wherein the heat treated component comprises a density ranging between about 1.8 g/cc and about 2.7 g/cc.

39. The process of claim 37, wherein the molar ratio of total aluminum to total phosphorus from the phosphoric acid is between about 10 and about 25.

40. A process for making a ceramic component comprising:

obtaining a slurry comprising
a quantity of ceramic powder having a mean particle size from about 1 micron to about 10 microns dispersed in water or a mixture of water and non-aqueous solvents; wherein the ceramic powder is present from about 10%-75% by weight of slurry; the ceramic powder being selected from the group consisting of alumina, alpha-alumina, boehmite, pseudoboehmite, diaspore, bauxite, beta-alumina, theta-alumina, gamma-alumina, and aluminum hydroxide;

a quantity of pore-former, from about 1%-45% by weight of slurry;

a quantity of second phase, from about 1%-75% by weight of slurry, wherein the second phase is in the form of fibers or powders selected from the group consisting of carbides, nitrides, borides, silicates, oxides, sulfates, aluminates, mixed oxides, mullite, zirconia, magnesia, spinel, chrome oxide, yttria, carbon, aluminosilicate, kyanite, clay, bentonite, sudaglass, iron oxide, glass frit, titania, perlite, zircon, vermiculite, silica, aluminum, iron, steel, zinc, copper, barium sulfate, zirconium diboride, calcium fluoride, pyrophillite, baddeleyite, magnesium, heat resistant polymeric powders or fibers, and hollow or solid alumina spheres, zirconia spheres, fillite spheres, and silica spheres;

a quantity of one or more organic additives selected from a group of organic dispersants, binders, plasticizers, drying aids, molding aids, preservatives, biocides, viscosity thinning aids, or viscosity thickening aids, from about 1% to 25% by weight of slurry;

mixing the slurry with a phosphate containing reagent to produce a slip such that the molar ratio of total aluminum to total phosphorus from the reagent is between 8 and about 65 and wherein the slurry is mixed at a temperature between 15° C. and less than 100° C.;

pouring the slip into a mold to form a green component by a process including chemical reaction bonding of the ceramic powder under the influence of said reagent; and applying a heat treatment to the green component.

41. The process of claim 40, further comprising a quantity of fiber from about 1%-60% by weight of the slurry, as a reinforcement phase.

42. The process of claim 40, wherein the slurry is milled to aid in dispersing the ceramic powder and the second phase in the slip.

43. The process of claim 40, wherein the heat treated component comprises a density ranging between about 1.8 g/cc and about 2.7 g/cc.

44. The process of claim 40, wherein the molar ratio of total aluminum to total phosphorus from the phosphoric acid is between about 10 and about 25.

* * * * *